(12) United States Patent
Batdorff

(10) Patent No.: US 8,534,056 B2
(45) Date of Patent: Sep. 17, 2013

(54) TEMPERATURE CONTROL DEVICE

(75) Inventor: Jonathan D. Batdorff, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 978 days.

(21) Appl. No.: 12/509,940

(22) Filed: Jul. 27, 2009

(65) Prior Publication Data

US 2011/0016857 A1    Jan. 27, 2011

(51) Int. Cl.
*F01N 3/00*    (2006.01)

(52) U.S. Cl.
USPC ............................................ 60/298

(58) Field of Classification Search
USPC .................... 60/295, 298, 311, 320, 323, 324
See application file for complete search history.

(56) References Cited

U.S. PATENT DOCUMENTS

| | | | |
|---|---|---|---|
| 2,211,795 A | | 8/1940 | Sauer |
| 3,605,389 A | * | 9/1971 | Buttler .......................... 55/482.1 |
| 6,267,199 B1 | | 7/2001 | Chang |
| 6,571,551 B2 | * | 6/2003 | Lundgren et al. ................ 60/298 |
| 7,845,338 B2 | * | 12/2010 | Smith et al. ................ 123/568.12 |
| 7,905,319 B2 | * | 3/2011 | Sullivan .......................... 181/250 |
| 2005/0205355 A1 | | 9/2005 | Lin |
| 2007/0245725 A1 | | 10/2007 | Brown et al. |
| 2007/0289293 A1 | * | 12/2007 | Kerchner et al. ................ 60/295 |

OTHER PUBLICATIONS

International Durastar document and two pages showing the exhaust system and a temperature control device, Mar. 17, 2009.

\* cited by examiner

*Primary Examiner* — Kenneth Bomberg
*Assistant Examiner* — Jason Sheppard
(74) *Attorney, Agent, or Firm* — Jeffrey P. Calfa; Mark C. Bach

(57) ABSTRACT

Temperature control devices have become common to cool the exhaust stream from a diesel particulate filter before release into the environment. To further cool the filtered exhaust stream, a temperature control device has plates that are approximately parallel and in a spaced apart relationship. A vent is located between the plates. The plates have apertures. A shield is also used.

8 Claims, 5 Drawing Sheets

TEMPERATURE CONTROL DEVICE

BACKGROUND

Embodiments disclosed herein relate to exhaust systems and more particularly to the reduction of exhaust gas temperature from a diesel particulate filtering system.

Elevated exhaust gas temperatures from the tail pipes of diesel engine equipped motor vehicles have become a greater problem with the introduction of diesel particulate trap/filters (DPF) and the need to regenerate these filters. Diesel particulate filters remove unburned and partially burned hydrocarbons from the exhaust streams produced by diesel engines. A DPF may be periodically regenerated by raising the temperature in the filter sufficiently to accelerate the oxidation of or ignite the particulate matter trapped in the filter. This process, once initiated, further increases the temperature of the exhaust stream downstream from the filter. The increase in the temperature of the exhaust may singe passers-by, particularly where the exhaust is discharged near ground level, and add stress on exhaust pipes.

Some prior systems achieved exhaust gas cooling as a byproduct of cooling a component, such as a muffler, in the exhaust system. In some contemporary pollution control schemes, components of the exhaust gas treatment system must run hot in order to operate or regenerate, making it undesirable to reduce exhaust gas temperature ahead of the component in question or to reduce the temperature of the component itself. For example, diesel particulate filter regeneration requires maintaining the temperature of the filter during regeneration.

A conventional method of cooling exhaust gases is an "in-can" or "in-muffler" venturi device. In the path of exhaust gas flow, the venturi device is located downstream of the muffler and upstream of the tailpipe, and uses ambient air to lower the overall temperature of the gases emitted from the tailpipe. In the venturi device, a "cold pipe" draws in ambient air, and sits within a "hot pipe" that forms the path of flow of the exhaust gases. The exhaust gases travel within the hot pipe and around the cold pipe. As the exhaust gases travel around the cold pipe, the exhaust gases are cooled. At an outlet of the cold pipe, the ambient gases and the exhaust gases are mixed in the tailpipe for further cooling. However, new emissions laws require that the exhaust gas temperatures be lowered beyond the capabilities of the conventional in-muffler venturi device.

Reducing the exhaust gas temperature after leaving the diesel particulate filter can be accomplished with a temperature control device. The temperature control device typically has inlets that allow fresh air into the device to mix the exhaust gas with the air to reduce the temperature of the exhaust.

SUMMARY

A temperature control device for an exhaust apparatus for a motor vehicle has a generally cylindrical body. Plates are approximately parallel in a spaced apart relationship and located at least partially within the body. A vent is located between the plates. Each plate has a peripheral edge and at least one aperture. Peripheral apertures are arranged radially between a central aperture and the edge. A shield extends radially and outwardly from the body.

DETAILED DESCRIPTION

Figure 1:
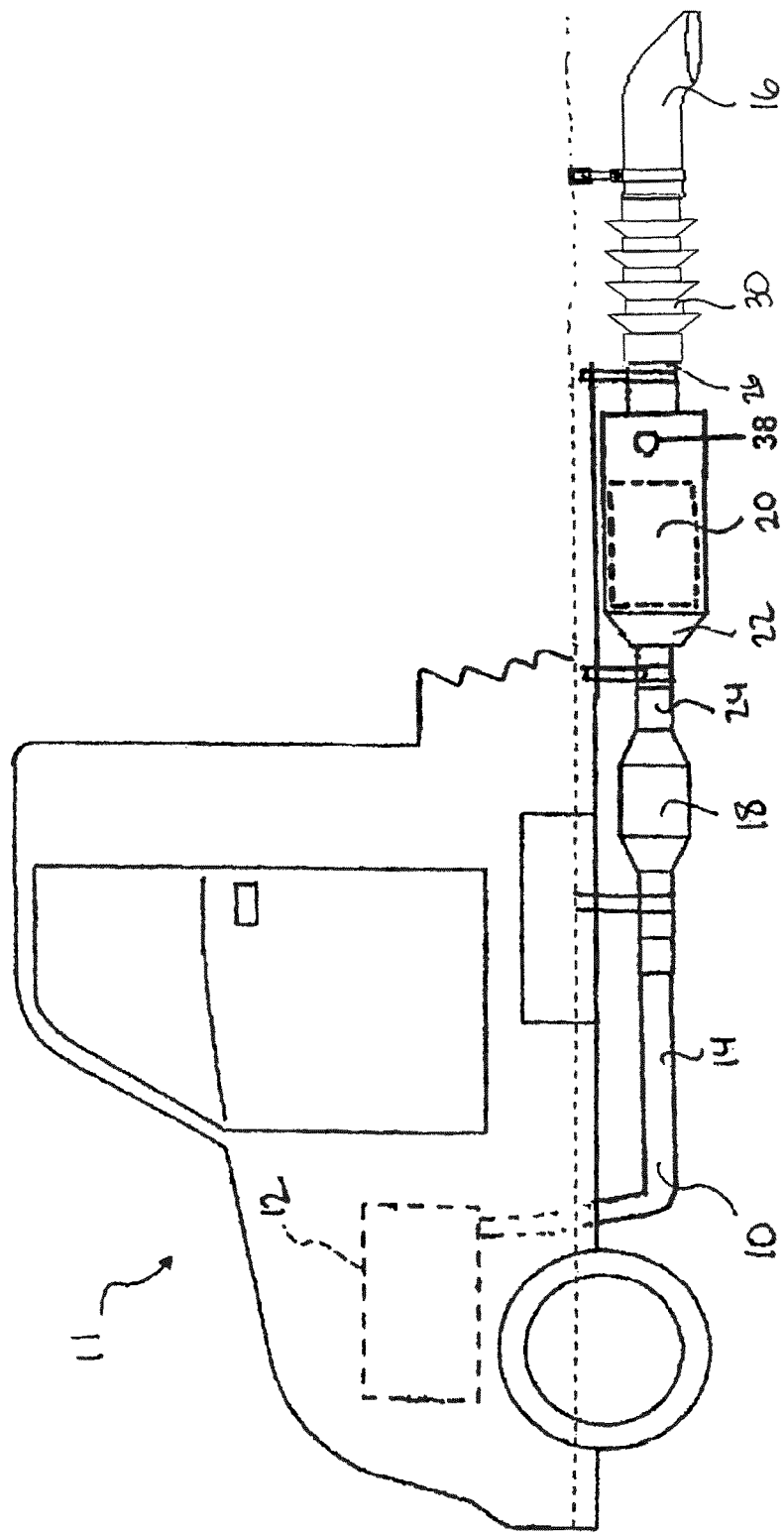
FIG. 1 is a plan view of a vehicle equipped with an exhaust system with a temperature control device.
Figure 2:
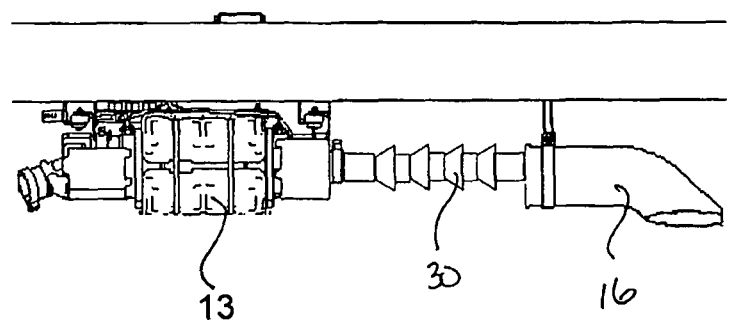
FIG. 2 is side view of an exhaust system with a temperature control device.

Referring to the drawings and in particular referring to FIG. 1, a vehicle such as a school bus or a truck 11, is typically equipped with a diesel engine 12 and an exhaust system 10 requiring use of a diesel particulate filter (DPF). The exhaust system 10 is installed on the motor vehicle 11 to the chassis 28 horizontally or under the vehicle 11.

The engine 12 is in fluid communication with the filter assembly 13 through entrance tubing 14 at the inlet side of the filter assembly 13. Treated exhaust flows from the filter assembly 13 through exit tubing 16, which can include a tailpipe, at the outlet side of the filter assembly 13.

The filter assembly 13 has a housing 22 and a diesel particulate filter 20 disposed therein. The filter assembly 13 may connect with a catalytic device 18 located between the engine 12 and the filter assembly 13. The housing 22 has a first conduit 24 in fluid communication with the entrance tubing 14. The opposite second conduit 26 is in fluid communication with the exit tubing 16.

A temperature control device 30 is installed in the exhaust system 10 to lower the temperature of the filtered exhaust. The temperature control device 30 is in fluid communication with the diesel particulate filter 20 to receive filtered exhaust, such as from the second conduit 26. The temperature control device 30 is also in fluid communication with the exit tubing 16, which is in fluid communication with the outside air.

The temperature control device 30 includes a generally cylindrical body 64. At least two approximately parallel plates 32, 34 are located at least partially within the body 64 in a spaced apart relationship. Vent 72 for receiving ambient air is located between the pair of plates 32, 34. A shield 46 extends outwardly from the body 64 of the temperature control device 30. The body 64 can include entrance tube 74 at one end, exit tube 76 at the opposite end and any inner tubing 78 located between the plates. Plates 32, 34 are approximately perpendicular to the length of the body 64 and can be approximately circular.

Plates 32, 34, vent 72 and shield 46 can be part of plate assembly 60, 61. The shield 46 can extend from an edge 44 of at least one of the plates 32, 34.

Each plate 32, 34 has one or more aperture, such as central aperture 36 and peripheral apertures 40 arranged radially around the central aperture 36 between a peripheral edge 44 and the central aperture 36. Approximately circular apertures are shown, although other aperture shapes can be used.

Each aperture can have an aperture wall. A central aperture wall 38 surrounds the central aperture 36 and extends from the plate 32. Each peripheral aperture 40 has a peripheral aperture wall 42 surrounding the peripheral aperture 40 and extending from the plate 32. The aperture walls 38, 42 can be approximately cylindrical or can have a smaller diameter distal to the plate 32 when the aperture is circular. The aperture walls will have other configurations when the aperture is not approximately circular. The aperture walls can be part of only one of the plates.

Figure 5:
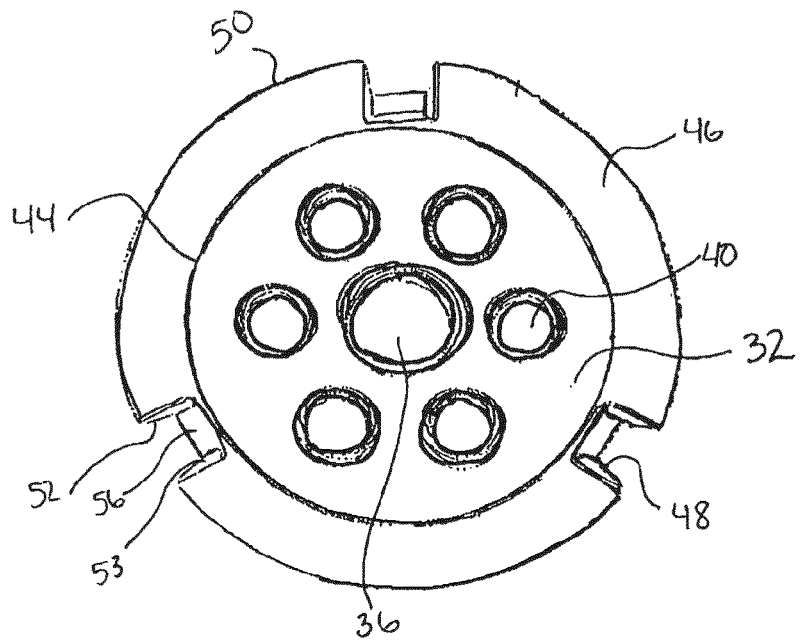
FIG. 5 is a bottom perspective view of a plate of a temperature control device.
Figure 6:
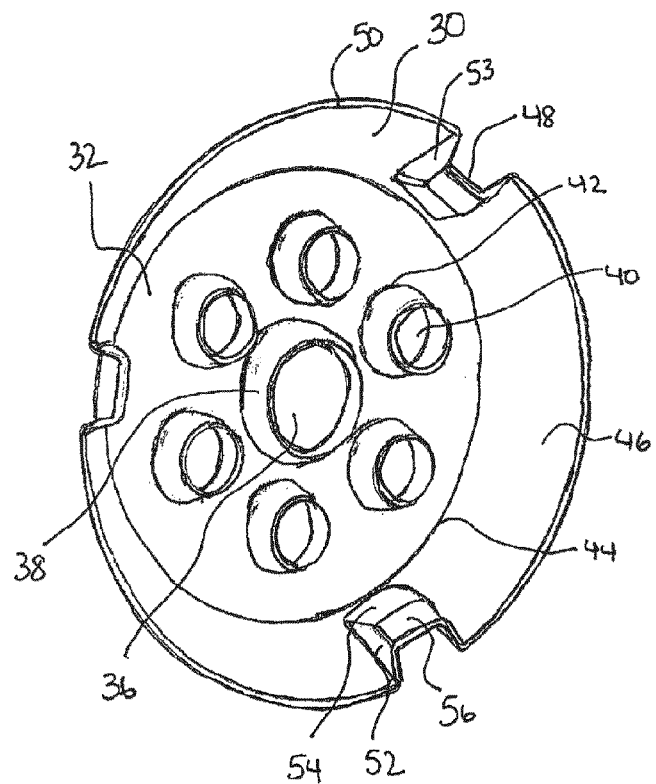
FIG. 6 is top plan view of a plate of a temperature control device.

One or more spacers 48 can separate one plate 32 from the other plate 34 and can be in any configuration that allows the separation. The spacer can be a separate component attaching to shield 46 of at least one of the plates. Spacer 48 alternatively is formed from shield 46 of at least one of the plates 32, 34. Spacer 48 can be located between edge 44 of a plate and the outer border 50 of at the of shield 46 or at the outer border 50. The spacer 48 shown in FIG. 5 has opposite side walls 52, 53 extending from the outer border 50 toward the apertures. Inner wall 54 is located between side walls 52, 53. A base wall 56 can connect the side walls 52, 53 and inner wall 54. The side walls 52, 53 and inner wall 54 can be angled or slanted. The outer edge of spacer 48 formed by side walls 52, 53 and base wall 56 can be approximately U-shaped to form a notch.

Figure 3:
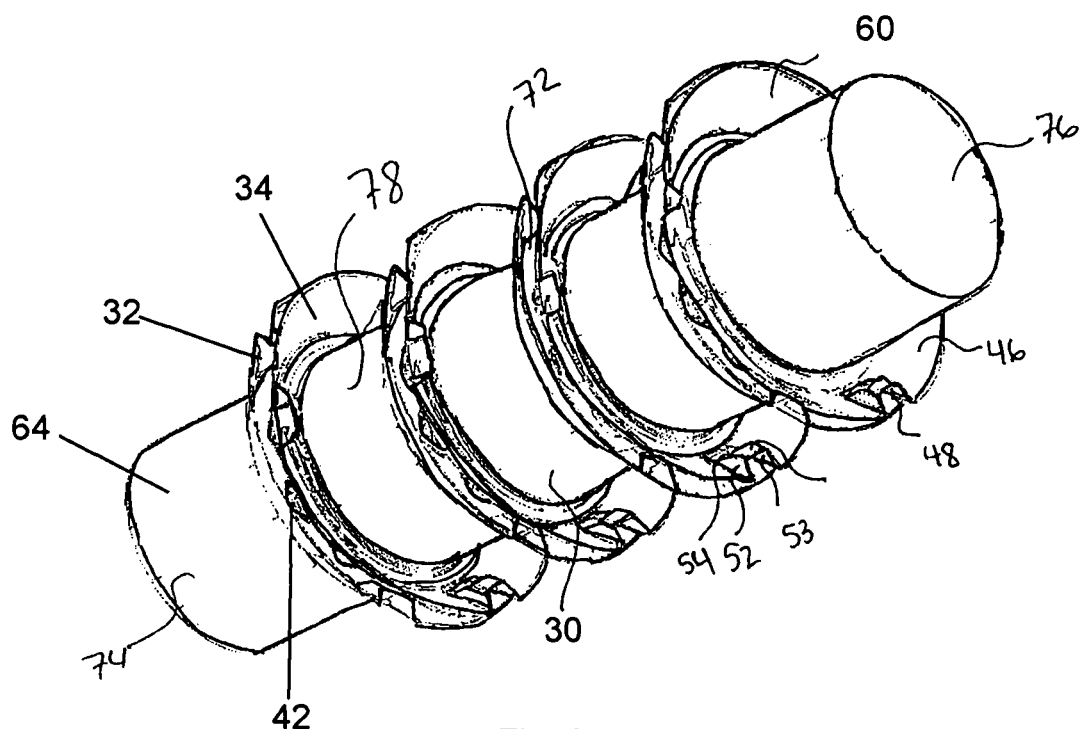
FIG. 3 is a perspective view of a temperature control device.
Figure 4:
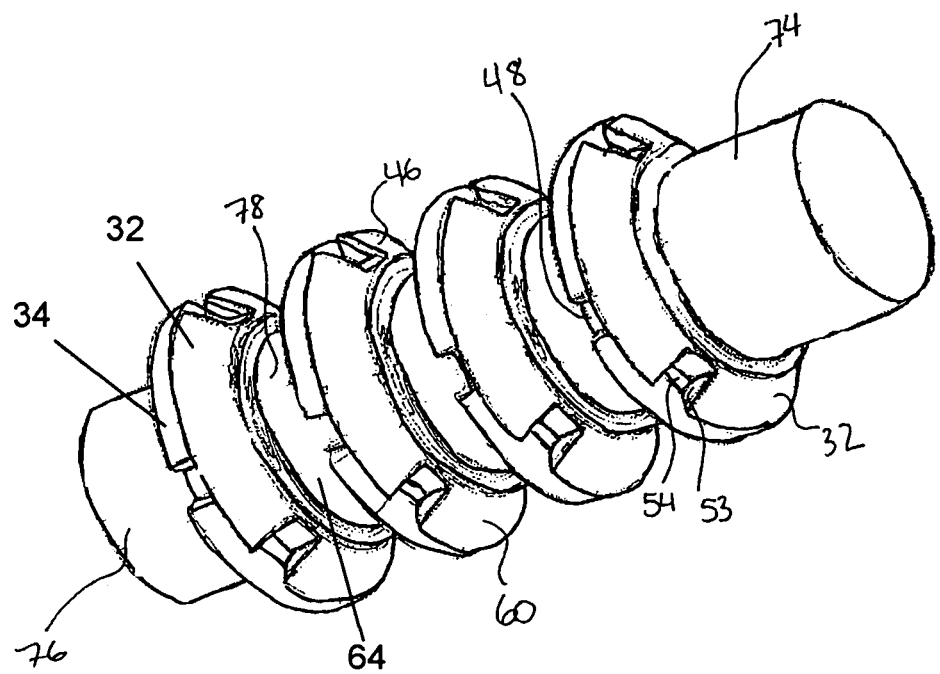
FIG. 4 is a perspective view of a temperature control device.
Figure 8:
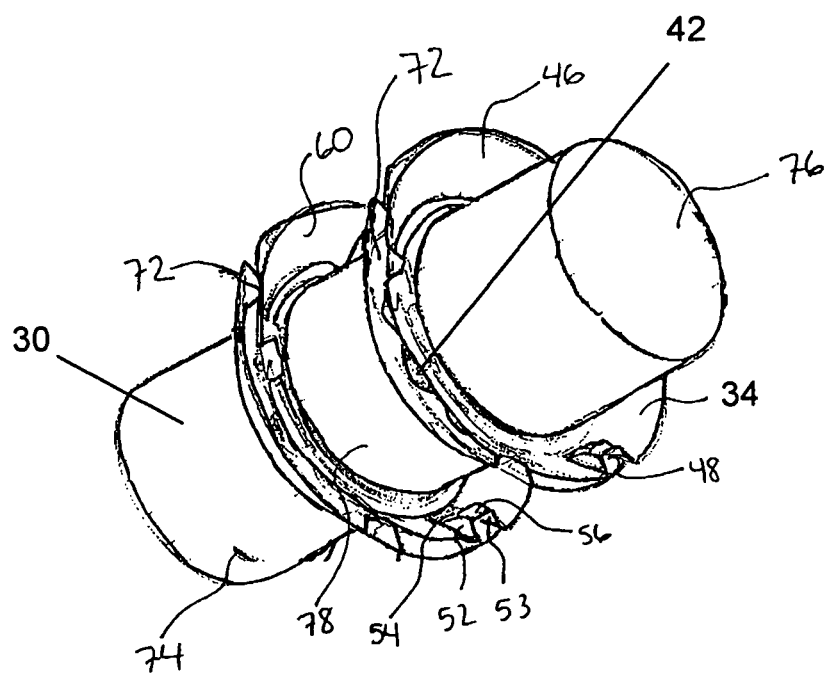
FIG. 8 is a perspective view of one embodiment of a temperature control device.

FIGS. 3 and 4 show plates 32, 34 disposed in a spaced apart relationship and nesting together to form plate assembly 60. A first plate 32 nests within second plate 34 after rotating the plate to allow the spacers 48 of one plate to engage the shield 46 of the other plate. Spacers 48 can be used to attach the plates 32, 34 to together. A vent 72 forms between the plates 32, 34 to allow ambient air into the temperature control device 30. Aperture walls of the first plate 32 insert within the apertures of the second plate 34. If both plates have aperture walls, the aperture walls of the first plate 32 can nest within the aperture walls of the second plate 34. Temperature control device 30 can have any number of plate assemblies 60, such as two shown in FIG. 8 and four shown in FIGS. 3 and 4. Temperature control device 30 attaches to the second conduit 26 at the entrance tube 74 and the exit tubing 16 at the opposite exit tube 76. Inner tubing 78 is located between at least two plate assemblies 60.

Figure 7:
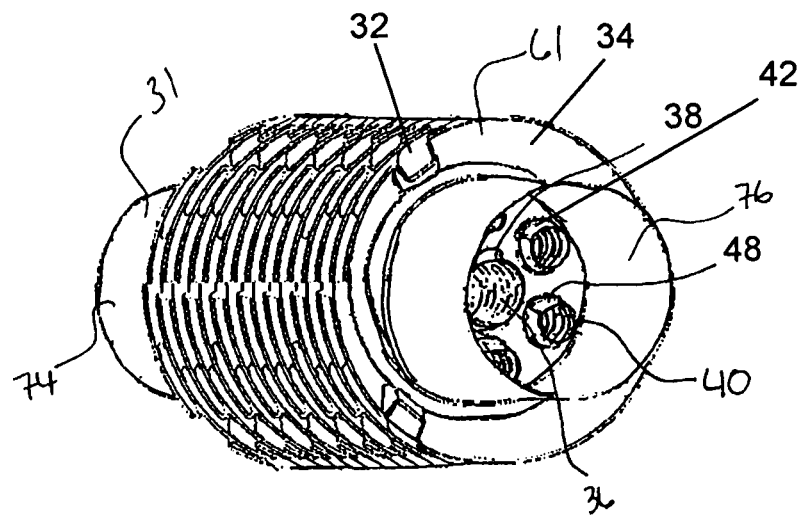
FIG. 7 is a bottom perspective view of one embodiment of a temperature control device.

In temperature control device 31, at least two plates 32, 34 are nested together and seated on spacers 48 of at least one of the plates to form plate assembly 61. The aperture walls 38, 42 of the first plate 32 insert within the apertures of the second plate 34. If both plates have aperture walls, the aperture walls of the first plate 32 can nest within the aperture walls of the second plate 34. In FIG. 7, every other plate of plate assembly 61 is rotated with the spacer 48 engaging the shield 46 of the other plate. A vent forms between the plates to allow ambient air into the temperature control device 31. Temperature control device 31 attaches to the second conduit 26 at the entrance tube 74 and the exit tubing 16 at the opposite exit tube 76.

The temperature control device installs within the exhaust system downstream from the DPF. The temperature control device can have the shield open either upstream or downstream from the DPF. Ambient air is drawn into the temperature control device through the vent. The ambient air mixes with the exhaust within the temperature control device and cools the exhaust.

While a shield is shown in the Figures, a duct or other similar apparatus can be used to surround the vents of the temperature control device in place of the shield.

What is claimed is:

1. A temperature control device for an exhaust apparatus for a motor vehicle, comprising:
    a generally cylindrical body having an entrance tube at one end, and an exit tube at an opposite end;
    plates being in an approximately parallel, spaced apart relationship and being approximately perpendicular to the generally cylindrical body, and a vent being located between the plates;
    wherein the plates comprise a first plate and a second plate;
    each plate having a peripheral edge, a central aperture, and peripheral apertures arranged radially between the central aperture and the peripheral edge;
    a central aperture wall surrounding the central aperture and extending from the first plate and through the central aperture of the second plate;
    peripheral aperture walls surrounding the peripheral apertures and extending from the first plate and through the peripheral apertures of the second plate;
    a central aperture wall surrounding the central aperture of the second plate and extending from the second plate;
    peripheral aperture walls surrounding the peripheral apertures and extending from the second plate;
    a first shield extending radially and outwardly from the peripheral edge of the first plate;
    wherein the first plate and the second plate are nested; and
    wherein the first shield extends outwardly from the body toward the exit tube.

2. The temperature control device for an exhaust apparatus for a motor vehicle of claim 1, further comprising:
    a second shield extending radially and outwardly from the peripheral edge of the second plate;
    a spacer separating the first plate and the second plate at the shields;
    wherein the first shield contains the spacer; and
    wherein the second shield extends outwardly from the body toward the exit tube and is seated on the spacer.

3. An exhaust apparatus for a motor vehicle, comprising:
    exit tubing;
    a filter assembly having a conduit in fluid communication with the exit tubing;
    a temperature control device in fluid communication with the filter assembly and the exit tubing, the temperature control device comprising a generally cylindrical body, plates being in an approximately parallel, spaced apart relationship and being approximately perpendicular to the body, and a vent between at least two of the plates;
    each of the plates having a peripheral edge, a central aperture, and peripheral apertures arranged radially between the central aperture and the peripheral edge;
    wherein the plates comprise a first plate, and a second plate;
    a central aperture wall surrounding the central aperture of the first plate and extending from the first plate and through the central aperture of the second plate;
    peripheral aperture walls surrounding the peripheral apertures of the first plate and extending from the first plate and through the peripheral apertures of the second plate; and
    a first shield extending radially and outwardly from the peripheral edge of the first plate toward the exit tubing.

4. The exhaust apparatus for a motor vehicle of claim 3, further comprising:
    a central aperture wall surrounding the central aperture of the second plate and extending from the second plate;
    peripheral aperture walls surrounding the peripheral apertures of the second plate and extending from the second plate; and
    wherein the first plate and the second plate are nested.

5. The exhaust apparatus for a motor vehicle of claim 3, further comprising:
    a second shield extending radially and outwardly from the peripheral edge of the second plate;
    a spacer on the second shield of the second plate engaging the first shield of the first plate; and
    wherein the first shield and the second shield extend radially and outwardly in the direction of the exit tubing.

6. The exhaust apparatus for a motor vehicle of claim 4, further comprising:
- a second shield extending radially and outwardly from the peripheral edge of the second plate toward the exit tubing; and
- a spacer separating the plates at the first shield and the second shield.

7. An exhaust apparatus for a motor vehicle, comprising:
exit tubing;
a filter assembly having a conduit in fluid communication with the exit tubing;
a temperature control device in fluid communication with the filter assembly and the exit tubing, the temperature control device comprising a generally cylindrical body, a first plate, a second plate being in an approximately parallel, spaced apart relationship with the first plate and being approximately perpendicular to the generally cylindrical body, and a vent being located between the first plate and the second plate;
each of the plates having a peripheral edge, a central aperture, and peripheral apertures arranged radially between the central aperture and the peripheral edge;
a central aperture wall surrounding the central aperture of the first plate and extending from the first plate and through the central aperture of the second plate;
peripheral aperture walls surrounding the peripheral apertures of the first plate and extending from the first plate and through the peripheral apertures of the second plate;
a shield extending radially and outwardly from the peripheral edge of each of the first plate and the second plate toward the exit tubing; and
a spacer on the shield of the second plate separating the first plate and the second plate at the shield of the first plate.

8. A temperature control device for an exhaust apparatus for a motor vehicle comprising:
a generally cylindrical body;
a plate assembly comprising plates being in an approximately parallel, spaced apart relationship and being approximately perpendicular to the generally cylindrical body, and a vent being located between the plates;
each plate having a peripheral edge, a central aperture, and peripheral apertures arranged radially between the central aperture and the peripheral edge;
wherein the plates comprise a first plate, and a second plate;
a central aperture wall surrounding the central aperture and extending from the first plate and through the central aperture of the second plate;
peripheral aperture walls surrounding the peripheral apertures and extending from the first plate and through the peripheral apertures of the second plate;
a first shield extending radially and outwardly from the peripheral edge of the first plate in the same direction as the peripheral aperture walls of the first plate extend;
a second shield extending radially and outwardly from the peripheral edge of the second plate;
a spacer on the second shield engaging the first shield; and
wherein the second shield extends radially and outwardly in the same direction as the first shield.

\* \* \* \* \*